United States Patent [19]
Kim

[11] Patent Number: 5,825,160
[45] Date of Patent: Oct. 20, 1998

[54] POWER CONTROL CIRCUIT IN WIRELESS MOBILE COMMUNICATION SYSTEM

[75] Inventor: Ji-Hwa Kim, Gumi, Rep. of Korea

[73] Assignee: SamSung Electronics Co., Ltd., Suwon, Rep. of Korea

[21] Appl. No.: 725,891

[22] Filed: Oct. 4, 1996

[30] Foreign Application Priority Data

Oct. 6, 1995 [KR] Rep. of Korea ................. 1995/34355

[51] Int. Cl.[6] ....................... H01M 10/44; H01M 10/46
[52] U.S. Cl. ........................................ 320/134; 320/136
[58] Field of Search ................................ 320/106, 116, 320/132, 134, 136, 165, DIG. 10, DIG. 12

[56] References Cited

U.S. PATENT DOCUMENTS

| | | | |
|---|---|---|---|
| 4,361,796 | 11/1982 | Akita et al. | 320/136 X |
| 4,613,990 | 9/1986 | Halpern . | |
| 4,870,698 | 9/1989 | Katsuyama et al. . | |
| 5,101,507 | 3/1992 | Jung . | |
| 5,239,695 | 8/1993 | Jung . | |
| 5,267,262 | 11/1993 | Whestley, III . | |
| 5,357,187 | 10/1994 | Park | 320/116 |
| 5,450,620 | 9/1995 | Vaisanen . | |
| 5,487,179 | 1/1996 | Larsson . | |
| 5,530,296 | 6/1996 | Masaki | 320/DIG. 10 |
| 5,557,192 | 9/1996 | Tamai | 320/164 |
| 5,642,028 | 6/1997 | Tai et al. | 320/111 |

*Primary Examiner*—Edward Tso
*Attorney, Agent, or Firm*—Robert E. Bushnell, Esq.

[57] ABSTRACT

A power control circuit for a wireless mobile communication system includes an over-voltage detection circuit that detects whether a battery is connected to or disconnected from the system, and generates a switching control signal in dependence upon the detection. A switching circuit responds to the switching control signal provided from the over-voltage detection circuit by connecting a voltage supplied through charging terminals to the battery when the switching control signal indicates that the battery is connected to the system, and disconnecting the voltage supplied through the charging terminals when the switching control signal indicates that the battery is disconnected from the system.

14 Claims, 1 Drawing Sheet

POWER CONTROL CIRCUIT IN WIRELESS MOBILE COMMUNICATION SYSTEM

CROSS-REFERENCE TO RELATED APPLICATIONS

This application makes reference to, incorporates the same herein, and claims all benefits accruing under 35 U.S.C. §119 arising from an application for Power Control Circuit In Wireless Mobile Communication System earlier filed in the Korean Industrial Property Office on 6 Oct. 1995 and there duly assigned Ser. No. 34355/1995.

BACKGROUND OF THE INVENTION

The present invention relates to a power control circuit for a wireless mobile communication system, and more particularly, to a power control circuit for protecting a wireless mobile communication system by interrupting the supply of a charging voltage when a battery is not connected to the system.

The concept of power control within wireless mobile communication systems has been the subject of several earlier circuit designs. Among these references include U.S. Pat. Nos. 5,101,507 and 5,239,695 assigned to the same assignee as the present invention. Both of these exemplary references, however, only discuss power control in regards to controlling radiating power during signal transmission. They fail to disclose how to control power that is provided to a battery of the communication system from a charging device.

In a conventional wireless mobile communication system, charging terminals for supplying a charging voltage are integrally combined with a battery pack that provides operating power to the system. Since the charging terminals and battery pack are combined, charging power from a charging device can not be input to the system when the battery pack is detached from the system.

Recently manufactured wireless mobile communication systems, however, employ a battery pack having a semi-pack form in which the battery and the charging terminals are separately provided for the purpose of reducing material costs. In these cases, the semi-pack battery can be easily separated from the system while a charging device is connected to a printed circuit board (PCB) of the wireless mobile communication system. Since the voltage provided from the charging device is substantially greater than the desired operating voltage, the voltage supplied to the system when the battery is detached can cause great damage to the circuitry of the wireless mobile communication system. The present invention is directed towards solving this problem.

SUMMARY OF THE INVENTION

Accordingly, it is an object of the present invention to provide an improved wireless mobile communication system.

It is another object to provide a power control circuit for a wireless mobile communication system.

It is yet another object to provide a power control circuit for a wireless mobile communication system that prevents transmission of a charging voltage when a battery is not connected to the system.

It is still another object to provide a power control circuit for a wireless mobile communication system that prevents damage to the system caused by excessive voltage.

To achieve these and other objects, the present invention provides a power control circuit for a wireless mobile communication system. The power control circuit may be constructed with an over-voltage detection circuit that detects whether a battery is connected to or disconnected from the system, and generates a switching control signal in dependence upon the detection. A switching circuit responds to the switching control signal provided from the over-voltage detection circuit by connecting a voltage supplied through charging terminals to the battery when the switching control signal indicates that the battery is connected to the system, and disconnecting the voltage supplied through the charging terminals when the switching control signal indicates that the battery is disconnected from the system.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
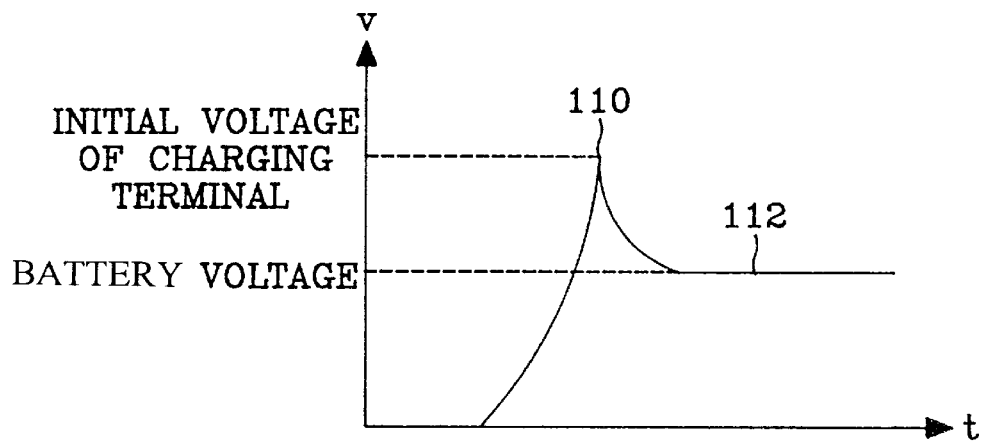
FIG. 1 is a voltage characteristic graph illustrating when a battery is mounted, and when a battery is not mounted in a general wireless mobile communication system.

Turning now to the drawings and referring to FIG. 1, a voltage characteristic graph illustrating when a battery is mounted, and when a battery is not mounted in a general wireless mobile communication system is shown. As indicated in FIG. 1, when the system is connected to a charging device, a voltage 110 initially supplied from the charging device is greater than a battery voltage 112. Accordingly, when a battery pack is combined with the system, the voltage supplied from the charging device does not rise above the battery voltage 112. On the other hand, when the battery pack is separated from the system, the voltage 110 initially supplied from the charging device is greater than the battery voltage 112.

Figure 2:
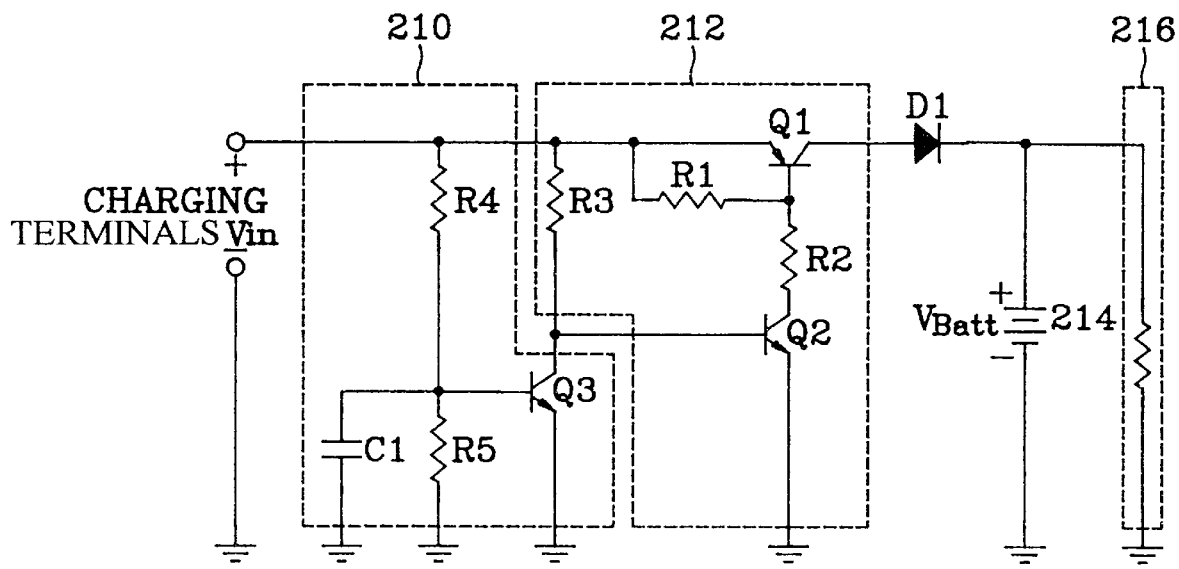
FIG. 2 is a power control circuit of a wireless mobile communication system in accordance with the principles of the present invention.

Referring to FIG. 2, a power control circuit for a wireless mobile communication system constructed in accordance with the principles of the present invention is shown. In FIG. 2, an over-voltage detection circuit 210 is connected between a switching device 212 and charging terminals through which voltage is supplied from a charging device. Over-voltage detection circuit 210 detects whether a battery 214 is separated or mounted, and then transmits a corresponding switching control signal to switching circuit 212. When the battery 214 is separated, the switching control signal is transmitted to switching circuit 212 in a logic "low" state, and when the battery 214 is mounted, the switching control signal is transmitted to switching circuit 212 in a logic "high" state. When the switching control signal exhibiting a logic "low" state is provided from over-voltage detection circuit 210, switching circuit 212 is turned off, and the charging voltage is not supplied to battery 214. Alternatively, when the switching control signal exhibiting a logic "high" state is provided from over-voltage detection circuit 210, switching circuit 212 is turned on, and the charging voltage is supplied to battery 214.

Over-voltage detection circuit 210 includes: resistors R4 and R5 for dividing the voltage supplied from the charging terminals, a transistor Q3 which generates the switching control signal and is turned on or off in dependence upon the voltage divided by resistors R4 and R5, and a capacitor C1 for momentarily turning off transistor Q3 while the charging voltage is initially supplied from the charging terminals. Resistor R4 and capacitor C1 determine the amount of time that transistor Q3 is turned off. If the amount of time that transistor Q3 is turned off is too long, damage to a system circuit 216 of the wireless mobile communication system may be caused. On the contrary, if the amount of time that transistor Q3 is turned off is too short, the power control circuit can not properly provide a power control function. Accordingly, a proper time has to be set by manipulating the values of resistor R4 and capacitor C1. According to a preferred embodiment, transistor Q3 is turned off for a period of time ranging from several tens to hundreds of microseconds.

Switching circuit 212 includes: a transistor Q2 which is turned on or off according to input of the switching control signal, a transistor Q1 which is turned on or off as the transistor Q2 is turned on or off and then connects or disconnects the charging terminals from the battery 214, and resistors R1, R2 and R3. Resistor R3 is set to a value that is sufficient to fully turn on transistor Q2, and resistor R2 is set to a value that is sufficient to fully turn on transistor Q1.

Hereinafter, the preferred embodiment of the present invention will be explained in detail with reference to FIGS. 1 and 2.

First, the operations when the wireless mobile communication system is connected to the charging device and the battery 214 is mounted within the system and is provided with voltage from the charging terminals will be described. In this situation, the voltage supplied through the charging terminals electrically charges the capacitor C1 during the time set according to the values of resistor R4 and capacitor C1. While the capacitor C1 is being charged, the voltage is not divided, and transistor Q3 is turned off. As a result, the voltage input through resistor R3 is used as a driving voltage $V_{BE}$ of transistor Q2. Transistor Q2 is turned on in response to the driving voltage $V_{BE}$. Due to this fact, the voltage at the base terminal of transistor Q1 becomes lower than the voltage at the emitter terminal of transistor Q1 connected through resistor R1, and transistor Q1 is turned on. Accordingly, electrical power supplied from the charging terminals is provided to battery 214 through a diode D1 that inhibits a reverse flow of electrical current. The voltage at the charging terminals can be derived through Kirchhoff's voltage law as follows:

$$V_{in}=V_{Batt}+V_{D1}+V_{th1},$$

where $V_{Batt}$ represents the voltage between two terminals of battery 214, $V_{D1}$ represents the voltage required when diode D1 is turned on, and $V_{th1}$ represents a threshold voltage of transistor Q1. Accordingly, the voltage supplied through the charging terminals is uniform by the constant voltage of battery 214. Transistor Q3 maintains the off state, and transistors Q1 and Q2 maintain the on state, thereby charging the battery 214.

Next, the operations when the wireless mobile communication system is connected to the charging device and the battery 214 is not mounted within the system will be described. In this situation, transistor Q3 is turned on while capacitor C1 is charged, just as in the previously described situation when battery 214 is mounted. However, when the battery 214 is not mounted, the input resistance of the power control circuit is much greater than an output resistance of the charging device. As a result, the voltage $V_{in}$ supplied through the charging terminals rises to a point 110, as shown in FIG. 1, and transistor Q3 of over-voltage detection circuit 210 is turned on by the voltage applied to its base terminal. The voltage provided to the base terminal of transistor Q2, which is connected to the collector terminal of transistor Q3, is cut off and transistor Q2 is accordingly turned off. As a result, the voltage at the base terminal of transistor Q1 is equal to the voltage at the emitter terminal of transistor Q1, and transistor Q1 is turned off. Therefore, the voltage provided from the charging device is interrupted.

As is apparent from the foregoing, when the battery is not mounted, the present invention senses this condition and cuts off the charging voltage, thereby preventing excess voltage to the wireless mobile communication system. Accordingly, damage to the system due to a user error can be prevented. Moreover, the reliability of the system is increased, and cost reductions can be achieved. Also, when using a battery pack having a semi-pack form, there is an advantage in that a reduction in material costs and an interchangeability between models of the parts can be achieved.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A power control circuit for a wireless mobile communication system, comprising:
   over-voltage detection means for detecting whether a battery is connected to or disconnected from said system, and generating a switching control signal in dependence upon the detection, said over-voltage detection means comprising:
      voltage dividing means serially connected between charging terminals, for dividing a voltage supplied through said charging terminals to generate a divided voltage;
      a first transistor for generating said switching control signal, said first transistor being turned on or off according to said divided voltage provided from said voltage dividing means; and
      charging means connected to a base terminal of said first transistor, for turning off said first transistor while the voltage supplied through said charging terminals is initially provided; and
   switching means for responding to said switching control signal provided from said over-voltage detection means by connecting the voltage supplied through said charging terminals to said battery when said switching control signal indicates that said battery is connected to said system, and disconnecting the voltage supplied through said charging terminals when said switching control signal indicates that said battery is disconnected from said system.

2. The power control circuit as claimed in claim 1, wherein said switching control signal exhibits a first logic state when said battery is connected to said system, and exhibits a second logic state when said battery is disconnected from said system.

3. The power control circuit as claimed in claim 1, wherein said first transistor further comprises:
a principal electrically conducting channel disposed between said switching means and a local reference potential.

4. The power control circuit as claimed in claim 1, wherein said voltage dividing means comprises a pair of resistors.

5. The power control circuit as claimed in claim 3, wherein said switching control signal exhibits a first logic state when said battery is connected to said system, and exhibits a second logic state when said battery is disconnected from said system.

6. The power control circuit as claimed in claim 4, wherein said switching control signal exhibits a first logic state when said battery is connected to said system, and exhibits a second logic state when said battery is disconnected from said system.

7. The power control circuit as claimed in claim 1, wherein said switching means comprises:
a second transistor having a base terminal connected to a collector terminal of said first transistor for receiving said switching control signal, said second transistor turning on when said switching control signal indicates that said battery is connected to said system and turning off when said switching control signal indicates that said battery is disconnected from said system; and
a third transistor having a base terminal connected to a collector terminal of said second transistor for connecting the voltage supplied through said charging terminals to said battery when said second transistor is turned on and disconnecting the voltage supplied through said charging terminals when said second transistor is turned off.

8. The power control circuit as claimed in claim 6, wherein said switching means comprises:
a second transistor having a base terminal connected to a collector terminal of said first transistor for receiving said switching control signal, said second transistor turning on when said switching control signal indicates that said battery is connected to said system and turning off when said switching control signal indicates that said battery is disconnected from said system; and
a third transistor having a base terminal connected to a collector terminal of said second transistor for connecting the voltage supplied through said charging terminals to said battery when said second transistor is turned on and disconnecting the voltage supplied through said charging terminals when said second transistor is turned off.

9. A method for controlling power in a wireless mobile communications system, comprising the steps of:
dividing a voltage supplied through charging terminals to generate a divided voltage, said dividing step being performed by voltage dividing means serially connected between said charging terminals;
charging a storage device connected across said charging terminals with the voltage supplied through said charging terminals;
detecting whether or not a battery is connected to said system, according to said divided voltage;
generating a switching control signal based upon said detecting step, said generating step being performed by a first transistor receiving said divided voltage;
connecting the voltage supplied through said charging terminals to said battery when said switching control signal indicates that said battery is connected to said system; and
disconnecting the voltage supplied through said charging terminals when said switching control signal indicates that said battery is not connected to said system.

10. The method as claimed in claim 9, wherein said switching control signal exhibits a first logic state when said battery is connected to said system, and exhibits a second logic state when said battery is not connected to said system.

11. A wireless mobile communication system, comprising:
charging terminals for connecting to a charging source that provides a charging voltage to a battery of said system;
a detection circuit for detecting whether or not said battery is connected to said system, and generating a switching control signal in dependence upon the detection said, detection circuit comprising:
a pair of resistors serially connected between said charging terminals, for dividing the charging voltage to generate a divided voltage;
a first transistor for generating said switching control signal, said first transistor being turned on or off according to said divided voltage; and
a capacitor connected to a base terminal of said first transistor, for turning off said first transistor while the charging voltage is initially provided;
a switching circuit for responding to said switching control signal provided from said detection circuit by enabling transmission of the charging voltage to said battery when said switching control signal indicates that said battery is connected to said system, and preventing transmission of the charging voltage when said switching control signal indicates that said battery is not connected to said system; and
a diode connected between said battery and said switching circuit for preventing a reverse flow of electrical current from said battery when said battery is connected to said system.

12. The wireless mobile communication system as claimed in claim 11, wherein said first transistor comprises:
a collector terminal connected to said switching circuit and transmitting said switching control signal to said switching circuit; and
an emitter terminal connected to a local reference potential.

13. The wireless mobile communication system as claimed in claim 12, wherein said switching circuit comprises:
a second transistor having a base terminal connected to said collector terminal of said first transistor for receiving said switching control signal, said second transistor turning on when said switching control signal indicates that said battery is connected to said system and turning off when said switching control signal indicates that said battery is not connected to said system; and
a third transistor having a base terminal connected to a collector terminal of said second transistor for enabling the transmission of the charging voltage to said battery when said second transistor is turned on and preventing The transmission of the charging voltage when said second transistor is turned off.

14. The wireless mobile communication system as claimed in claim 13, wherein said switching control signal exhibits a first logic state when said battery is connected to said system, and exhibits a second logic state when said battery is not connected to said system.

* * * * *